United States Patent
Kryka et al.

(10) Patent No.: US 8,250,551 B2
(45) Date of Patent: Aug. 21, 2012

(54) REFINING TAIL CALL OPTIMIZATIONS AT LINK-TIME

(75) Inventors: James A. Kryka, Rochester, MN (US); Tim C. Muehe, Rochester, MN (US); Robert R. Roediger, Rochester, MN (US); Roger W. Southwick, Northfield, MN (US)

(73) Assignee: International Business Machines Corporation, Armonk, NY (US)

( * ) Notice: Subject to any disclaimer, the term of this patent is extended or adjusted under 35 U.S.C. 154(b) by 1253 days.

(21) Appl. No.: 12/015,745

(22) Filed: Jan. 17, 2008

(65) Prior Publication Data

US 2009/0187884 A1 Jul. 23, 2009

(51) Int. Cl.
*G06F 9/44* (2006.01)
*G06F 9/45* (2006.01)

(52) U.S. Cl. ........ 717/151; 717/122; 717/137; 717/140; 717/152; 717/141

(58) Field of Classification Search .................. None
See application file for complete search history.

(56) References Cited

U.S. PATENT DOCUMENTS

| | | | |
|---|---|---|---|
| 5,522,072 A | 5/1996 | De Bruler | |
| 5,590,332 A * | 12/1996 | Baker | 717/151 |
| 6,064,820 A * | 5/2000 | Subrahmanyam | 717/160 |
| 6,101,326 A | 8/2000 | Mattson, Jr. | |
| 6,131,188 A * | 10/2000 | Goebel | 717/151 |
| 6,135,650 A * | 10/2000 | Goebel | 717/143 |
| 6,934,935 B1 * | 8/2005 | Bennett et al. | 717/151 |
| 7,130,972 B2 | 10/2006 | Yamamoto et al. | |
| 7,171,655 B2 * | 1/2007 | Gordon et al. | 717/141 |
| 7,290,253 B1 * | 10/2007 | Agesen | 717/141 |
| 7,555,747 B1 * | 6/2009 | Agesen | 717/141 |
| 7,661,096 B2 * | 2/2010 | Meijer et al. | 717/141 |
| 7,698,697 B2 * | 4/2010 | Grcevski et al. | 717/151 |
| 7,703,087 B1 * | 4/2010 | Prakash | 717/157 |
| 7,937,694 B2 * | 5/2011 | Meijer et al. | 717/140 |
| 2005/0183058 A1 * | 8/2005 | Meijer et al. | 717/100 |
| 2005/0183071 A1 * | 8/2005 | Meijer et al. | 717/140 |
| 2007/0300213 A1 * | 12/2007 | Adolphson et al. | 717/151 |
| 2008/0320246 A1 * | 12/2008 | Fuhler et al. | 711/154 |
| 2010/0169872 A1 * | 7/2010 | Lapkowski et al. | 717/154 |

OTHER PUBLICATIONS

John Clements et al., A Tail-Recursive Machine with Stack Inspection, vol. 26, No. 6, Nov. 2004, [Retrieved on Apr. 4, 2012]. Retrieved from the internet: <URL: http://www.ccs.neu.edu/racket/pubs/cf-toplas04.pdf> 24 Pages (1030-1052).*

Peiyi Tang et al., Complete Inlining of Recursive Calls: Beyond Tail-Recursion Elimination, Mar. 10-12, 2006, [Retrieved on Apr. 4, 2012]. Retrieved from the internet: <URL: http://www.ualr.edu/pxtang/papers/acmse06-b.pdf> 6 Pages (1-6).*

Vasanth Bala et al., Dynamo: A Transparent Dynamic Optimization System, ACM 1-58113-199-2/00/0006, 2000, [Retrieved on Apr. 4, 2012]. Retrieved from the internet: <URL: http://personals.ac.upc.edu/vmoya/docs/bala.pdf> 12 Pages (1-12).*

* cited by examiner

*Primary Examiner* — Don Wong
*Assistant Examiner* — Anibal Rivera
(74) *Attorney, Agent, or Firm* — Rabin & Berdo, P.C.

(57) ABSTRACT

A method and apparatuses for allowing additional tail call optimizations. The compiler generates both optimized and non-optimized code for tail call candidates. At a later time when there is more information (e.g. regarding program bounds), a decision and a modification to the executable code is made, implementing one of the two earlier codes.

21 Claims, 4 Drawing Sheets

REFINING TAIL CALL OPTIMIZATIONS AT LINK-TIME

BACKGROUND

This invention relates to instruction optimization in computers. More specifically, it relates to compiler optimizations via a method and apparatuses for allowing additional tail call optimizations which can be further refined at link time (i.e. post-compilation).

Compilers translate high-level code, e.g. C++, which is developed by and readable by human beings, into a low-level machine code. This low-level machine code, also commonly known as object code, is a set of instructions that a computer is able to understand and consequently implement. This translation process is known as compilation. Object code is often referred to as executable or execution code when it is run, producing whatever intended functionality of the original programmers.

This compilation process in the past resulted in executable code that was not as efficient as it possibly could be. Over time, various means of optimizing the executable code, based on general observations of the high level code and any other intermediate versions of the code generated during compilation, as well as other time-tested improvements have resulted in greatly improved and more efficient object code, consequently delivering better software performance.

One such long-recognized method of object code optimization is the tail call optimization. A computer program typically includes many invocations of, also known as calls to, other sub-programs, also known as functions or procedures. Each of these calls may in turn call on other different functions. To keep track of where the program should go to after it completes execution of a function, the data structure of a stack is used. This is a last-in-first-out structure, where each stack frame represents one invocation of a function. Specifically in this case, the top of the invocation stack is the frame of the function that is being executed at a given moment. The presence of calls to other procedures typically requires the creation and overhead of a new stack frame for the calling procedure. As the main program runs, the stack will grow as subsequent calls to other procedures are made. When procedures are completed, any stack frames that were created for the lifetime of the procedures are then destroyed.

The case of a procedure containing tail call(s) presents a special opportunity for optimization. A tail call is any call in a procedure, which immediately exits the procedure upon return (i.e. no other executable code is allowed after the call). For those skilled in the art, a procedure containing only tail calls can be optimized to eliminate the need for creating a stack frame by transforming each tail call from doing a formal call to the target code to be that of a simple transfer of control (e.g. unconditional branch/jump operation).

BRIEF SUMMARY

A computer implemented method for allowing additional tail call optimization opportunities in executable code by identifying at compile-time at least one procedure as a candidate for tail call optimization, performing the tail call optimizations and deferring to a subsequent step (e.g. link time) the final determination on whether the tail call optimization(s) can stay in place. According to the result of this decision, the executable code is modified. This described process may be contained in a computer readable medium, which may be utilized in a computer system in which the computer readable medium resides.

DETAILED DESCRIPTION

Figure 1:
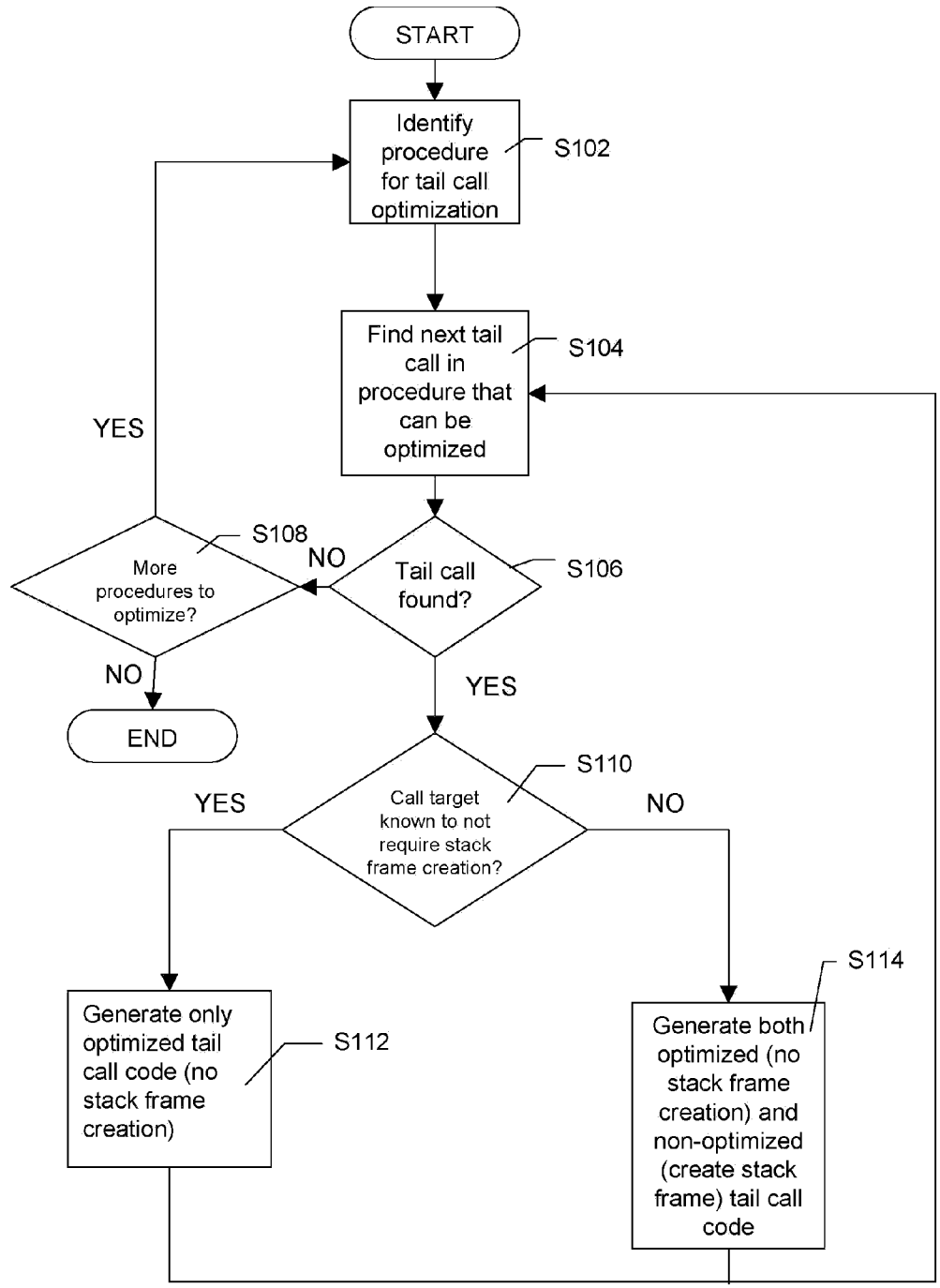
FIG. 1 is a flowchart showing the compilation-phase of the optimization decision process.

The invention will now be described in more detail by way of example with reference to the embodiments shown in the accompanying Figures. It should be kept in mind that the following described embodiments are only presented by way of example and should not be construed as limiting the inventive concept to any particular physical configuration. Further, if used and unless otherwise stated, the terms "upper," "lower," "front," "back," "over," "under," and similar such terms are not to be construed as limiting the invention to a particular orientation. Instead, these terms are used only on a relative basis.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: a computer-readable storage medium such as an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. The computer-readable medium would further include a transmission medium such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The uses of tail call optimizations are limited, despite their advantages. For instance, the tail call function may make an external call that is completely outside the current bounds of the program, e.g. to another service or process on the machine. A separate stack frame must be present in the calling function consequently to handle any exceptions that may arise. Compilers will generally not optimize for the tail call situation if there is this possibility and simply create the new stack frame. This can be overly pessimistic since an external call to a target that is inside the bound program could very well not require the creation of a stack frame. Information about the characteristics of an external call are not available, however, at the early stages of compiling; consequently, some compilers never perform tail call optimization, or only perform this optimization in limited instances.

According to one embodiment, the optimization process includes two phases: a compilation phase and a link-time phase. During the compilation phase the tail call optimization will be performed. The link-time phase is when object code, or the larger pieces of the object code have already been translated, are subsequently being linked together to form the larger and final program code. The linker accomplishes this task by determining whether or not to allow the optimization and adjusts the code accordingly as needed.

FIG. 1 is a flowchart demonstrating the compilation phase for this embodiment of the invention. First, in state S102, a procedure in the program that is eligible for tail call optimization is identified. Various well-known approaches to accomplish this are known to those skilled in the art. Any of these known approaches would be effective. When a procedure is identified, then, the first tail call in the procedure is searched for in state S104. A decision is then made at S106: if there is a tail call found, then proceed on to S110. Otherwise proceed onto S108. In the case of a tail call not being found, then the procedure does not have any more tail calls and the compiler moves on to another procedure to optimize in S108. If there are no more procedures to optimize in the program, then the compilation-phase is complete. If there are more procedures to optimize, then the next procedure is identified for optimization in S102.

Figure 3:
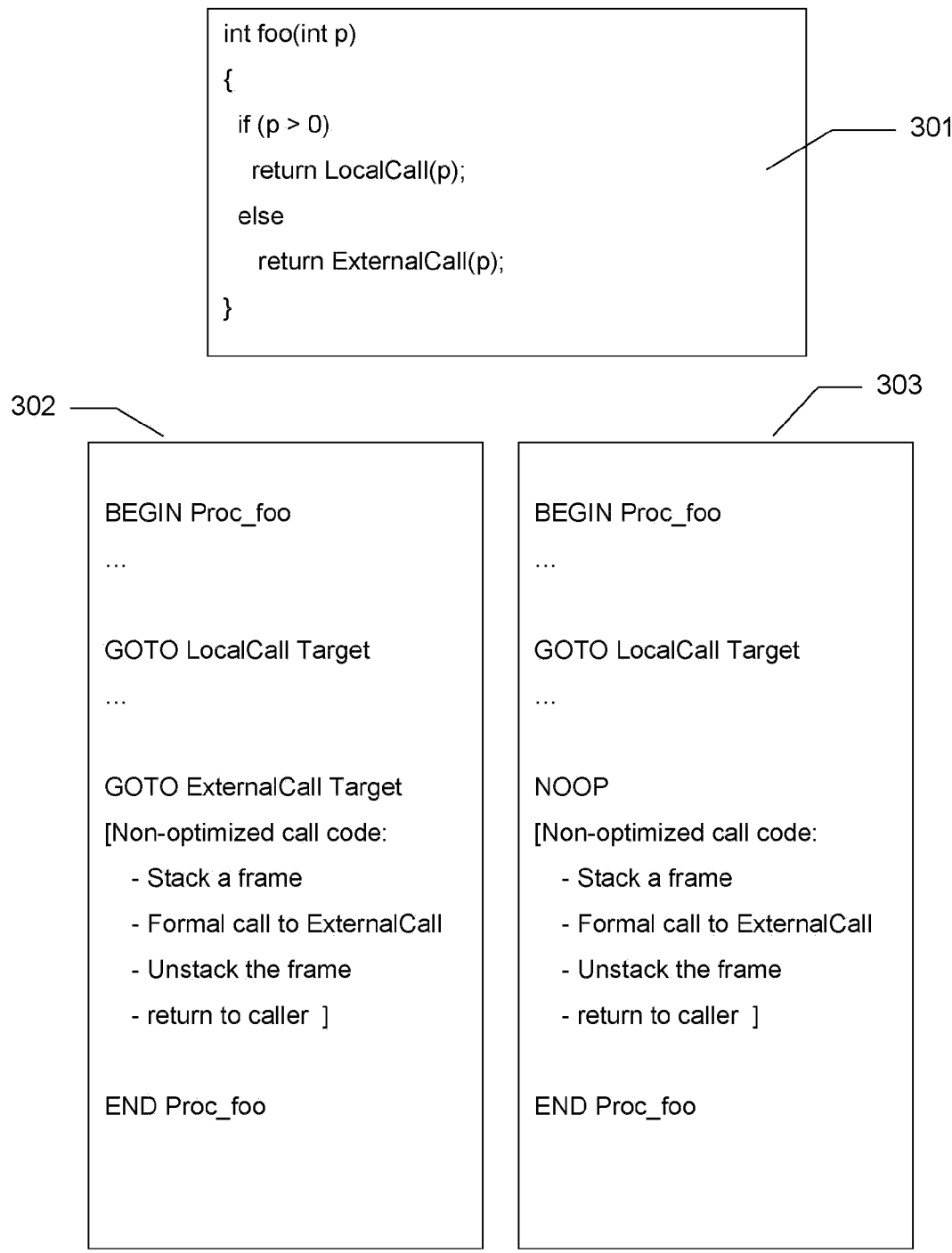
FIG. 3 is conceptual diagram of an example of the machine-level code that is affected by the invention.

Meanwhile, if there is a tail call that is found in the procedure, the compiler will determine if the call target is known to not require stack frame creation in S110. If there is no stack frame creation, then optimized code is generated in S112. The optimized code does not require creation of any new stack frames, or does not call a function that is external to the module or some other code that is efficient over the calls of the original code. On the other hand, if the compiler can not determine that the target requires stack frame creation, then both optimized and non-optimized tail call code is generated in S114. An example of this resulting code is seen in FIG. 3. The procedure in 301 would result in the generated code of 302. Non-optimized code is code that does create a stack frame. Subsequent to both S112 and S114, that is after the generation of the appropriate code, the compiler returns to S104, which moves on to the next tail call candidate in the procedure.

Figure 2:
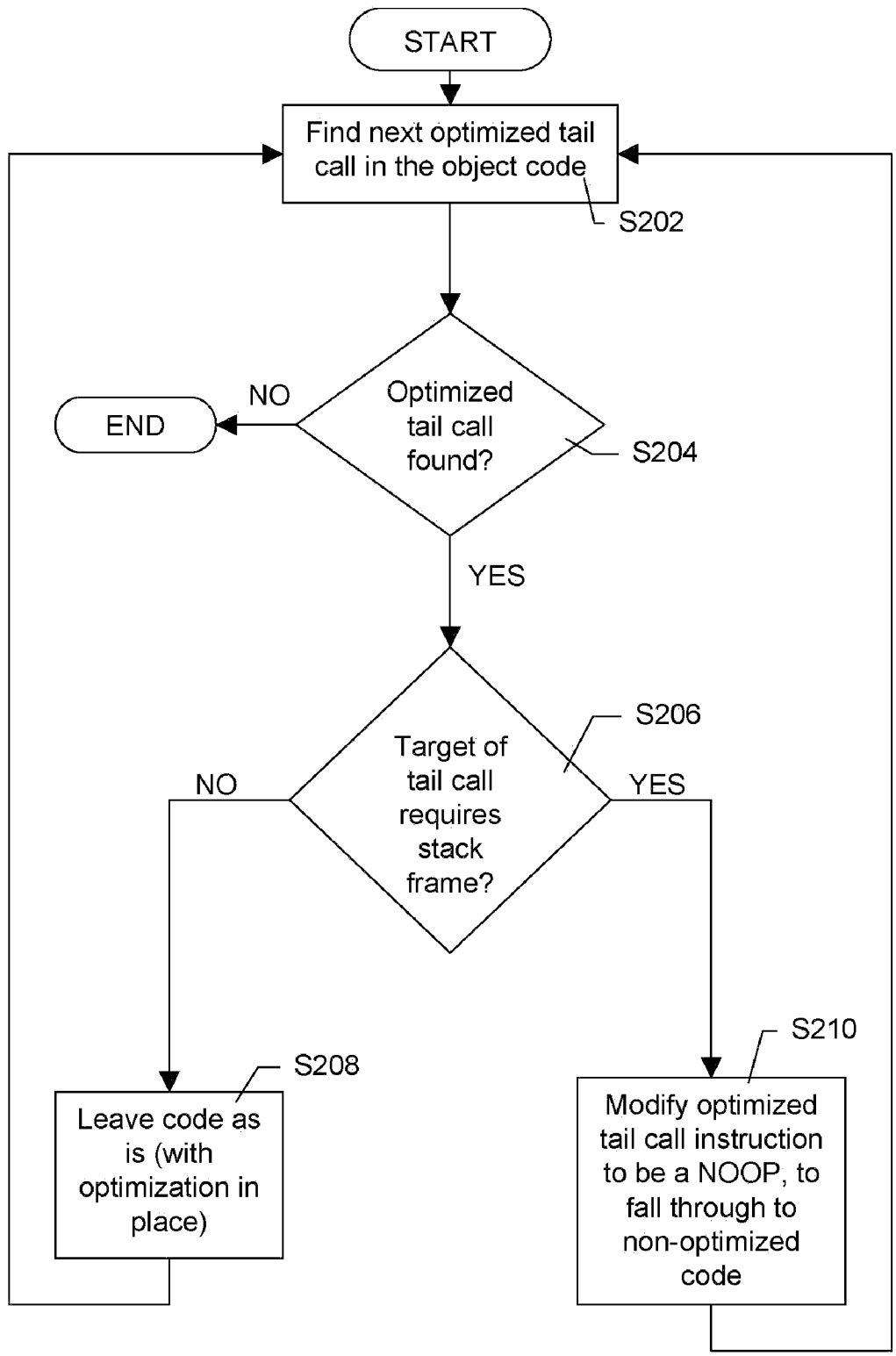
FIG. 2 is a flowchart showing the linking-phase of the optimization decision process.

The compiler continues until it completes the compilation process, and then the link-time phase begins, as illustrated in FIG. 2. At S202, the first optimized tail call in the object code is found. The linker evaluates whether there was any optimized tail call code found in the object code in S204. If there isn't any, then the linking is complete for the entire program and the linker concludes. Otherwise, it considers the optimized tail call code that was found. It determines now whether or not the target of the tail call requires a stack frame in S206. If the target does not require a stack frame, then the object code is left as is (that is, with the optimization in place) as in S208. If on the other hand a stack frame is required, then the optimized tail call instruction is changed to be a NOOP, as in step S210. FIG. 3, 303 illustrates this resulting situation. A NOOP instruction is a no-operation instruction (i.e. state of the machine is not changed), basically a "go to the next instruction." Consequently, during run-time, the non-optimized code will be reached, and be executed. The linker will then continue on its translation back to S202 to find the next optimized tail call in the object code.

It is likely that this method may be called numerous times during the overall program creation process and may even be called in parallel on more than one processor at the same time.

An alternate embodiment of the invention may have a plurality of instructions generated for an optimized tail call. In this case, each instruction would then be modified to be a NOOP. One skilled in the art would be able to implement various methods for modifying the code to select the desired tail call sequence (e.g. modify the first instruction of the optimized tail call sequence to branch to the non-optimized version of the tail call or even generate two copies of the calling procedure where the correct version would be selected and used at link time).

In another embodiment of the invention, these steps of deciding and modifying the executable code may be conducted during run-time, which is during the execution of the program.

Figure 4:
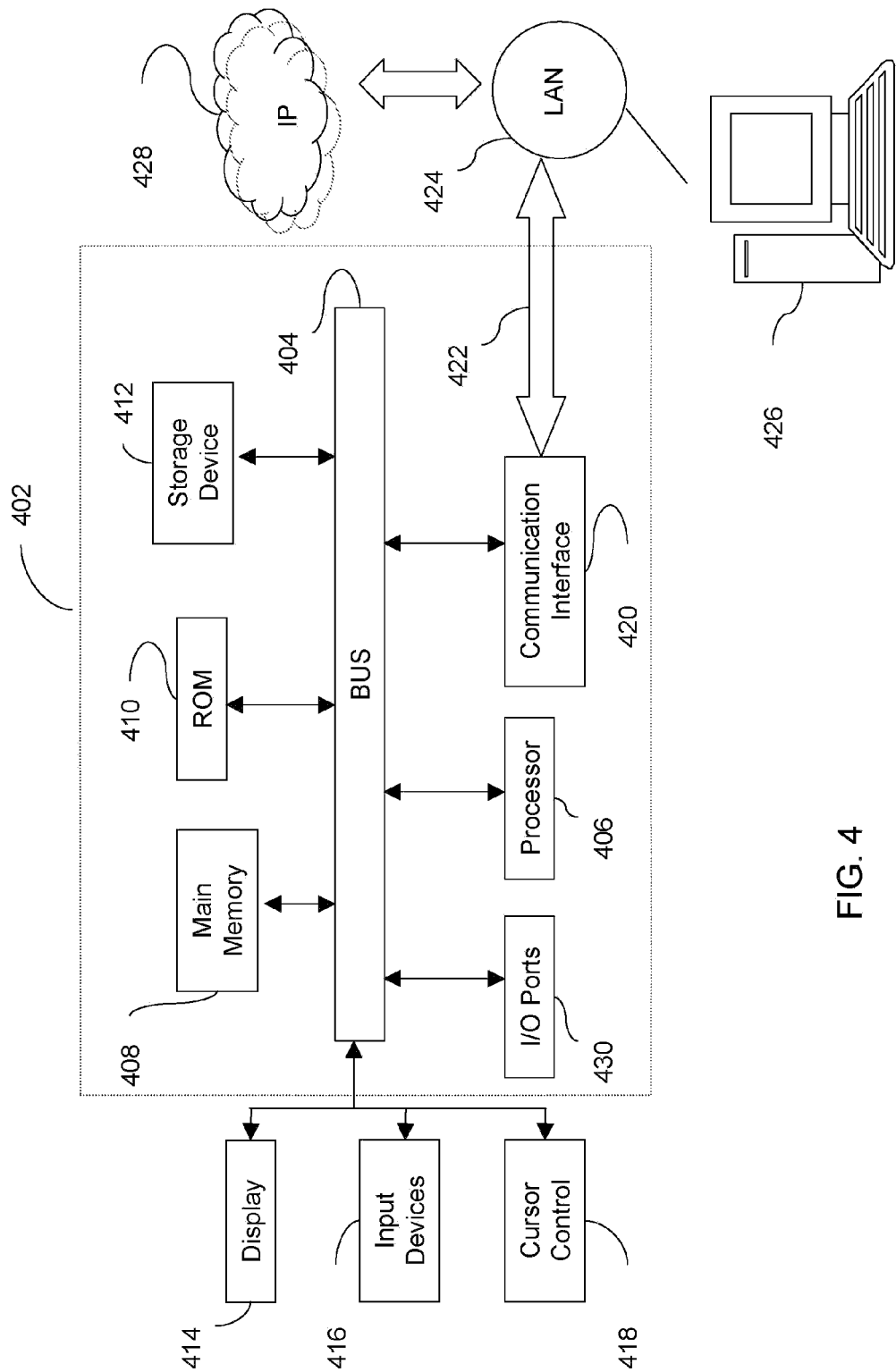
FIG. 4 is a conceptual diagram of a computer system.

FIG. 4 illustrates a computer system (402) upon which the present invention may be implemented. The computer system may be any one of a personal computer system, a work station computer system, a lap top computer system, an embedded controller system, a microprocessor-based system, a digital signal processor-based system, a hand held device system, a personal digital assistant (PDA) system, a wireless system, a wireless networking system, etc. The computer system includes a bus (404) or other communication mechanism for communicating information and a processor (406) coupled with bus (404) for processing the information. The computer system also includes a main memory, such as a random access memory (RAM) or other dynamic storage device (e.g., dynamic RAM (DRAM), static RAM (SRAM), synchronous DRAM (SDRAM), flash RAM), coupled to bus for storing information and instructions to be executed by processor (406). In addition, main memory (408) may be used for storing temporary variables or other intermediate information during execution of instructions to be executed by processor. The computer system further includes a read only memory (ROM) 410 or other static storage device (e.g., programmable ROM (PROM), erasable PROM (EPROM), and electrically erasable PROM (EEPROM)) coupled to bus 404 for storing static information and instructions for processor. A storage device (412), such as a magnetic disk or optical disk, is provided and coupled to bus for storing information and instructions. This storage device is an example of the computer readable medium, upon which the program may be encoded.

The computer system also includes input/output ports (430) to input signals to couple the computer system. Such coupling may include direct electrical connections, wireless connections, networked connections, etc., for implementing automatic control functions, remote control functions, etc. Suitable interface cards may be installed to provide the necessary functions and signal levels.

The computer system may also include special purpose logic devices (e.g., application specific integrated circuits (ASICs)) or configurable logic devices (e.g., generic array of logic (GAL) or re-programmable field programmable gate arrays (FPGAs)), which may be employed to replace the functions of any part or all of the method of allowing additional tail call optimizations as described with reference to FIG. 1. Other removable media devices (e.g., a compact disc, a tape, and a removable magneto-optical media) or fixed, high-density media drives, may be added to the computer system using an appropriate device bus (e.g., a small computer system interface (SCSI) bus, an enhanced integrated device electronics (IDE) bus, or an ultra-direct memory access (DMA) bus). The computer system may additionally include a compact disc reader, a compact disc reader-writer unit, or a compact disc jukebox, each of which may be connected to the same device bus or another device bus.

The computer system may be coupled via bus to a display (414), such as a cathode ray tube (CRT), liquid crystal display (LCD), voice synthesis hardware and/or software, etc., for displaying and/or providing information to a computer user. The display may be controlled by a display or graphics card. The computer system includes input devices, such as a keyboard (416) and a cursor control (418), for communicating information and command selections to processor (406). Such command selections can be implemented via voice recognition hardware and/or software functioning as the input devices (416). The cursor control (418), for example, is a mouse, a trackball, cursor direction keys, touch screen display, optical character recognition hardware and/or software, etc., for communicating direction information and command selections to processor (406) and for controlling cursor movement on the display (414). In addition, a printer (not shown) may provide printed listings of the data structures, information, etc., or any other data stored and/or generated by the computer system.

The computer system performs a portion or all of the processing steps of the invention in response to processor executing one or more sequences of one or more instructions contained in a memory, such as the main memory. Such instructions may be read into the main memory from another computer readable medium, such as storage device. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

The computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The computer system also includes a communication interface coupled to bus. The communication interface (420) provides a two-way data communication coupling to a network link (422) that may be connected to, for example, a local network (424). For example, the communication interface (420) may be a network interface card to attach to any packet switched local area network (LAN). As another example, the communication interface (420) may be an asymmetrical digital subscriber line (ADSL) card, an integrated services digital network (ISDN) card or a modem to provide a data communication connection to a corresponding type of telephone line.

Wireless links may also be implemented via the communication interface (420). In any such implementation, the communication interface (420) sends and receives electrical, electromagnetic or optical signals that carry digital data streams representing various types of information.

Network link (422) typically provides data communication through one or more networks to other data devices. For example, the network link may provide a connection to a computer (426) through local network (424) (e.g., a LAN) or through equipment operated by a service provider, which provides communication services through a communications network (428). In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit notifications and receive data, including program code, through the network(s), the network link and the communication interface.

It should be understood, that the invention is not necessarily limited to the specific process, arrangement, materials and components shown and described above, but may be susceptible to numerous variations within the scope of the invention. Additionally, a person skilled in the art will readily be able to implement the source code and means of performing this optimization. The invention is applicable to any compiler-based computer programming languages for use on different types of computers and may constitute an embodiment that incorporates the teachings of the present invention.

What is claimed is:

1. A computer implemented method for allowing additional tail call optimizations in executable code, comprising:
   identifying at least one procedure for tail call optimization;
   generating at compile-time non-optimized tail call code for the at least one procedure;
   generating at compile-time optimized tail call code for the at least one procedure;
   deciding at link-time post-compilation to utilize one of the non-optimized tail call code and the optimized tail call code;
   modifying the executable code to utilize the one of the non-optimized tail call code and the optimized tail call code according to a result of the deciding; and
   writing the modified executable code to a computer readable medium.

2. The method of claim 1, wherein the generating optimized tail call code is done subsequent to the generating of the non-optimized tail call code.

3. The method of claim 1, wherein the optimized tail call code does not create stack frames.

4. The method of claim 1, wherein the deciding takes place after the generating of optimized tail call code and the generating of non-optimized tail call code.

5. The method of claim 1, wherein the deciding results in the optimized tail call code being used and wherein the modifying comprises replacing the optimized tail call code with a NOOP instruction, thereby allowing the executable code to fall through to the non-optimized tail call code.

6. The method of claim 1, wherein the deciding utilizes the optimized tail call code and wherein the modifying comprises replacing a first instruction of the optimized tail call code with an unconditional branch to the non-optimized tail call code sequence thereby bypassing any remaining instructions in the optimized tail call code.

7. The method of claim 1, wherein the deciding is performed at one of at run-time and before run-time.

8. A computer program product for allowing additional tail call optimizations in executable code, the computer program product comprising:
   a non-transitory computer-readable storage medium having computer usable program code embodied therewith, the computer usable program code comprising
   instructions to identify at least one procedure for tail call optimization;
   instructions to generate non-optimized tail call code for the at least one procedure;
   instructions to generate optimized tail call code for the at least one procedure;
   instructions to decide post-compilation to utilize one of the non-optimized tail call code and the optimized tail call code; and
   instructions to modify the executable code to utilize the one of the non-optimized tail call code and the optimized tail call code according to a result of the deciding.

9. The computer program product of claim 8, wherein the instructions to generate optimized tail call code are done subsequent to the generating of the non-optimized tail call code.

10. The computer program product of claim 8, wherein the instructions to generate optimized tail call code do not create stack frames.

11. The computer program product of claim 8, wherein the instructions to decide are performed after the generating of optimized tail call code and the generating of non-optimized tail call code.

12. The computer program product of claim 8, wherein the instructions to decide results in the optimized tail call code being used, and wherein the instructions to modify comprise instructions to replace a call to the optimized tail call code with a NOOP instruction, thereby allowing the executable code to fall through to the non-optimized tail call code.

13. The computer program product of claim 8, wherein the instructions to decide utilizes the optimized tail call code and wherein the instructions to modify comprises instructions to replace a first instruction of the optimized tail call code with an unconditional branch to the non-optimized tail call code sequence thereby bypassing any remaining instructions in the optimized tail call code.

14. The computer program product of claim 8, wherein the instructions to decide are performed at one of at run-time and before run-time.

15. A computer system comprising:
   a processor;
   a memory operatively coupled to the processor;
   a storage device operatively coupled to the processor and memory; and
   a computer program product for allowing additional tail call optimizations in executable code, the computer program product comprising a computer usable medium storable in the storage device, and having computer usable program code embodied therewith, the computer usable program instructions comprising:
   instructions to identify at least one procedure for tail call optimization;
   instructions to generate non-optimized tail call code for the at least one procedure;
   instructions to generate optimized tail call code for the at least one procedure;
   instructions to decide post-compilation to utilize one of non-optimized tail call code and the tail-call optimization code; and instructions to modify the executable code to utilize the one of the non-optimized tail call code and the optimized tail call code according to a result of the deciding.

16. The system of claim 15, wherein the instructions to generate optimized tail call code are done subsequent to the generating of the non-optimized tail call code.

17. The system of claim 15, wherein the instructions to generate optimized tail call code do not create stack frames.

18. The system of claim 15, wherein the instructions to decide are performed after the instructions to generate optimized tail call code and the instructions to generate non-optimized tail call code.

19. The system of claim 15, wherein the instructions to decide results in the optimized tail call code being used, and wherein the instructions to modify comprises replacing a call to the optimized tail call code with a NOOP instruction, thereby allowing the executable code to fall through to the non-optimized tail call code.

20. The system of claim 15, the instructions to decide utilizes the optimized tail call code and wherein the instructions to modify comprises replacing a first instruction of the optimized tail call code with an unconditional branch to the non-optimized tail call code sequence thereby bypassing any remaining instructions in the optimized tail call code.

21. The system of claim 15, wherein the instructions to decide are performed at one of at run-time and before run-time.

* * * * *